United States Patent
Reinhardt et al.

(10) Patent No.: US 9,775,109 B2
(45) Date of Patent: Sep. 26, 2017

(54) MICRO SLEEP MODE CONTROL FOR A RECEIVER

(75) Inventors: Steffen Reinhardt, Nuremberg (DE); Rainer Bachl, Nuremberg (DE); Stefan Mueller-Weinfurtner, Nuremberg (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 252 days.

(21) Appl. No.: 13/878,798

(22) PCT Filed: Oct. 12, 2010

(86) PCT No.: PCT/EP2010/006219
§ 371 (c)(1),
(2), (4) Date: Apr. 11, 2013

(87) PCT Pub. No.: WO2012/048717
PCT Pub. Date: Apr. 19, 2012

(65) Prior Publication Data
US 2013/0194995 A1  Aug. 1, 2013

(51) Int. Cl.
*G08C 17/00*  (2006.01)
*H04W 52/02*  (2009.01)

(52) U.S. Cl.
CPC ... *H04W 52/0209* (2013.01); *H04W 52/0219* (2013.01); *H04W 52/0258* (2013.01); *H04W 52/0235* (2013.01); *Y02B 60/50* (2013.01)

(58) Field of Classification Search
None
See application file for complete search history.

(56) References Cited

U.S. PATENT DOCUMENTS

| 7,542,437 B1 * | 6/2009 | Redi | H04W 52/0206 |
| | | | 370/311 |
| 2003/0138059 A1 * | 7/2003 | Xu | H04L 1/0068 |
| | | | 375/316 |

(Continued)

FOREIGN PATENT DOCUMENTS

| CN | 101431790 A | 5/2009 |
| WO | 2007092644 A2 | 8/2007 |
| WO | 2008137596 A1 | 11/2008 |

OTHER PUBLICATIONS

Qualcomm Europe, "DRX Procedure for VoIP", 3GPP Draft, R2-073298, 3rd Generation Partnership Project (3GPP), Mobile Competence Centre, 650, Route Des Lucioles, F-06921 Sophia-Antipolis Cedex, France, vol. RAN WG2, No. Athens, Greece, Aug. 15, 2007, XP050136014.

(Continued)

*Primary Examiner* — Christopher Wyllie
(74) *Attorney, Agent, or Firm* — Rothwell, Figg, Ernst & Manbeck, P.C.

(57) ABSTRACT

A technique for controlling a receiver to enter a micro sleep mode during which at least one receiver component is temporarily switched off is described. The receiver is configured to process sub-frames each having a first sub-frame portion followed by a second sub-frame portion, the first sub-frame portion carrying information indicative of whether or not the second sub-frame portion needs to be decoded. A method implementation of this technique comprises the steps of providing a regular micro sleep mode in which the receiver component is switched off after the first sub-frame portion has been decoded in case the decoding indicates that the second sub-frame portion does not need to be decoded, providing an extended micro sleep mode in which the receiver component is switched off immediately after the first sub-frame portion has been received, evaluat- (Continued)

ing a mode setting criterion, and controlling the receiver to enter the regular micro sleep mode or the extended micro sleep mode depending on the mode setting criterion.

21 Claims, 6 Drawing Sheets

(56) References Cited

U.S. PATENT DOCUMENTS

| | | |
|---|---|---|
| 2004/0014505 A1 | 1/2004 | Rainish et al. |
| 2008/0192722 A1* | 8/2008 | Jung ............... H04L 1/1867 370/345 |
| 2009/0016252 A1* | 1/2009 | Ho ............... H04W 52/0283 370/311 |
| 2009/0181689 A1* | 7/2009 | Lee ............... H04L 1/1854 455/450 |
| 2009/0327828 A1* | 12/2009 | Ojala ............... H04L 1/1887 714/749 |
| 2010/0195607 A1* | 8/2010 | Lee ............... H04W 74/0866 370/329 |
| 2010/0232285 A1* | 9/2010 | Lee ............... H04B 7/15507 370/210 |
| 2010/0272037 A1* | 10/2010 | Lee ............... H04W 52/0235 370/329 |
| 2010/0284379 A1* | 11/2010 | Bitran ............... H04L 5/0087 370/338 |
| 2011/0044239 A1* | 2/2011 | Cai ............... H04W 72/042 370/328 |
| 2011/0044261 A1* | 2/2011 | Cai ............... H04L 5/0053 370/329 |
| 2011/0176466 A1* | 7/2011 | Lindoff ............... H04W 52/0225 370/311 |
| 2013/0182599 A1* | 7/2013 | Bachl ............... H04L 25/0232 370/252 |

OTHER PUBLICATIONS

Office Action dated Aug. 5, 2015, issued in Chinese Patent Application No. 201080069580.X, 20 pages.

* cited by examiner

MICRO SLEEP MODE CONTROL FOR A RECEIVER

CROSS-REFERENCE TO RELATED APPLICATION

This application is a 35 U.S.C. §371 National Phase Entry Application from PCT/EP2010/006219, filed Oct. 12, 2010, and designating the United States.

TECHNICAL FIELD

The present disclosure relates to operational control of a receiver. In particular, a technique is presented for controlling a receiver to enter a micro sleep mode during which at least one receiver component is temporarily switched off.

BACKGROUND

It is generally desirable to reduce power consumption of electronic devices having receiving functionalities. Especially battery-operated mobile terminals benefit from a reduced receiver power consumption. The benefits include longer stand-by and operational times.

Mobile terminals usually conform to one or more mobile communication standards that define, inter alia, operational states for the receiver. As an example, the Long Term Evolution (LTE) standard of the 3$^{rd}$ Generation Partnership Project (3GPP) specifies so-called "idle" and "connected" states for the physical layer of a mobile terminal (also referred to as User Equipment, or UE, in the LTE standard). The physical layer includes receiver components, the operation of which will thus by influenced by the current state setting.

When the UE is in idle state, there are no ongoing transfers in the receiving and transmitting directions. The UE is only waking-up from time to time to check whether a connection request is coming in. An incoming connection request is signalled at so-called paging occasions. In idle state, the power consumption is therefore heavily reduced because the receiver components are switched off most of the time and only briefly switched on at paging occasions.

In connected state, the receiver components are switched on most of the time as the UE has to listen to the Physical Downlink Control Channel (PDCCH), which is transmitted in a first portion of a sub-frame. The PDCCH is used to transfer scheduling grants indicating that there is a transmission on the Physical Downlink Shared Channel (PDSCH) to the UE in a subsequent second portion of the current sub-frame. In case a PDSCH transmission is indicated to the UE either in the PDCCH or by semi-persistant scheduling, the remainder of the sub-frame has to be received and the PDSCH has to be decoded. Reception must also continue in other scenarios such as intra-frequency measurements or Broadcast Channel (BCH) readings.

There are still many scenarios in connected state in which decoding of the first sub-frame portion reveals that the remainder of the sub-frame following the PDCCH is of no interest to the UE and in which reception can be terminated until the next sub-frame arrives. Terminating reception by switching off one or more receiver components during the resulting short gap between the end of the first portion of one sub-frame and the beginning of the next sub-frame is also referred to as micro sleep.

In the LTE standard, a sub-frame has a duration of 1 ms and downlink transmissions are based on Orthogonal Frequency Division Multiplexing (OFDM). OFDM-based systems use block processing that includes a Fast Fourier Transform (FFT) in a digital receiver domain for OFDM demodulation. The digital receiver domain (Digital Front End, or DFE) before the FFT is based on sample processing. The PDCCH can be spread over up to 4 OFDM symbols for a system bandwidth of 1.4 MHz and over up to 3 OFDM symbols for larger bandwidths.

FIG. 1 shows a schematic timing diagram illustrating the processes of entering and leaving a micro sleep mode in an exemplary LTE scenario in which the PDCCH is spread over 3 OFDM symbols. In a regular reception mode ("Rx on period" in FIG. 1), a signal from an analog radio front end is sampled at a given sampling rate and the resulting signal samples are buffered in a memory. The buffered signal samples are subjected to FFT processing for a demodulation of the received OFDM symbols that pertain to the PDCCH. After OFDM demodulation, channel estimation and demapping steps are performed as is generally known in the art.

In a further step, the PDCCH is decoded to determine whether the remainder of the sub-frame has to be received (and whether the PDSCH has to be decoded) also, or whether the receiver can enter a micro sleep mode ("Rx off period" in FIG. 1) in which one or more receiver components are switched off. The time it takes to enter the micro sleep mode ("'Switching off' period") is typically rather short and therefore not illustrated in FIG. 1. On the other hand, the micro sleep mode has to be left early enough ("'Switching on' period" in FIG. 1) to ensure that the regular reception mode is entered again for the next sub-frame.

The effective duration of the micro sleep mode between reception of two subsequent sub-frames is determined by the duration and the processing time of the PDCCH (which depend on the number of OFDM symbols to be received and demodulated), the time needed to switch the receiver component off and on, as well as inherent latencies (caused, e.g., by processing of the signal samples in the DFE). Accordingly, the effective duration $T_{micro}$ of the micro sleep mode can be expressed as $$T_{micro} = 1 \text{ ms} - (T_{DFE} + T_{PDCCH} + T_{proc} + T_{rxoff} + T_{rxon}) \quad \text{Eq. (1),}$$

wherein $T_{DFE}$ is the DFE processing latency, $T_{PDCCH}$ is the duration of the PDCCH, $T_{proc}$ is the processing time until the decision is available that there is no PDSCH scheduled in the current sub-frame, and $T_{rxoff}$ and $T_{rxon}$ are the periods of time it takes to switch the receiver components off and on, respectively. The micro sleep mode can only be entered if the effective duration $T_{micro}$ is larger than zero.

Assuming a normal (i.e., not extended) Cyclic Prefix (CP), a system bandwidth of more than 1.4 MHz (in which case the PDCCH is spread over a maximum of 3 OFDM symbols), and the following exemplary parameters $T_{DFE} = 10$ µs $T_{PDCCH,max} = 215$ µs $T_{proc} = 250$ µs $T_{rxoff} = 15$ µs $T_{rxon} = 200$ µs, the effective duration $T_{micro}$ of the micro sleep mode amounts to $T_{micro} = 1$ ms$-(10$ µs$+215$ µs$+250$ µs$+15$ µs$+200$ µs$)=310$ µs It should be noted that the above parameters are generally use case dependent, so there may be use cases in which the micro sleep mode can be entered and other use cases in which this may not be the case. Moreover, the processing time $T_{proc}$ additionally depends on the available processing capabilities and the implemented channel estimation concept.

It has been found that micro sleep concepts of the type discussed above help to reduce the power consumed by the receiver. It would nonetheless be desirable to achieve a further reduction in receiver power consumption.

SUMMARY

There is a need for an improved micro sleep concept. In particular, there is a need for a micro sleep concept that helps to achieve a further reduction of receiver power consumption.

According to one aspect, a method of controlling a receiver to enter a micro sleep mode wherein which at least one receiver component is temporarily switched off is presented. The receiver is configured to process sub-frames each having a first sub-frame portion followed by a second sub-frame portion, wherein the first sub-frame portion carries information indicative of whether or not the second sub-frame portion needs to be decoded. The method comprises providing a regular micro sleep mode in which the receiver component is switched off after the first sub-frame portion has been decoded in case the decoding indicates that the second sub-frame portion does not need to be decoded, providing an extended micro sleep mode in which the receiver component is switched off immediately after the first sub-frame portion has been received, evaluating a mode setting criterion, and controlling the receiver to enter the regular micro sleep mode or the extended micro sleep mode depending on the mode setting criterion.

In addition to the regular micro sleep mode and the extended micro sleep mode, one or more further receiver modes may be provided and entered. Such further receiver modes may comprise one or more of a regular reception mode and another (i.e., a third, fourth, and so on) micro sleep mode. The duration of a micro sleep mode may generally be defined to be shorter than a radio frame duration and, in particular, to be shorter than a sub-frame duration. In an exemplary LTE scenario, the maximum duration of a micro sleep mode may thus be below 1 ms.

In the extended micro sleep mode, when the receiver component has been switched off, the first sub-frame portion may still be decoded to determine whether the second sub-frame portion would need to be decoded. Should the decoding of the first sub-frame portion indicate that the second sub-frame portion would need to be decoded also, a re-transmission of the (missed) second sub-frame portion may be triggered.

Moreover, in such a case the receiver may be controlled to enter the regular micro sleep mode or the regular reception mode. Such an approach permits to regularly receive and decode the re-transmitted second sub-frame portion. Specifically, the re-transmitted second sub-frame portion may be received (in either one of the regular micro sleep mode and the regular reception mode) in a first step. In a second step, a Hybrid Automatic Repeat Request (HARQ) buffer may be initialized based on the re-transmission.

The mode setting criterion may be based on various items of information. For example, the mode setting criterion may be based on short-term statistics regarding whether or not second sub-frame portions needed to be decoded previously. Alternatively, or in addition, the mode setting criterion may be based on a priori knowledge. Such a priori knowledge may relate to one or more of a semi-persistent allocation of relevant content in the second sub-frame portion, a measurement schedule, a re-transmission behaviour, channel conditions, a Shared Channel (SCH) reading and a BCH reading. In case the receiver is configured to evaluate the mode setting criterion on a per sub-frame basis, the evaluation may be skipped for one or more sub-frames depending on the a priori knowledge.

In a still further variant, that may be combined with any of the above variants, the mode setting criterion may be based on expiry of one or more timers. Such timers may include at least one of an uplink time alignment timer and a downlink inactivity timer.

In one implementation, the first sub-frame portion is defined by a predetermined number of modulation symbols representative of at least a first transmission channel. Additionally, or in the alternative, the second sub-frame portion may be defined by a predetermined number of modulation symbols representative of at least a second transmission channel. The first transmission channel may be the PDCCH and the second transmission channel may be the PDSCH according to the LTE standard.

The first sub-frame portion may carry various items of information. As an example, the information carried in the first sub-frame portion and indicative of the necessity to decode the second sub-frame portion may relate to a downlink scheduling grant. The downlink scheduling grant may be associated with information transmitted in the second sub-frame portion of the same sub-frame.

The technique presented herein may be implemented in the form of hardware, in the form of software or as a combined software/hardware solution. As for a software aspect, a computer program product is provided comprising program code portions for performing the steps of any of the methods and method aspects presented herein when the computer program product is executed on a computing device. The computer program product may be stored on a computer-readable recording medium such as a permanent or a re-writable memory, CD-ROM, or DVD. The computer program product may also be provided for download via a communication network such as the Internet, a cellular communication network or a wireless or wired Local Area Network (LAN).

According to another aspect, a receiver that is controllable to enter a micro sleep mode during which at least one receiver component is temporarily switched off is provided. The receiver is configured to process sub-frames each having a first sub-frame portion followed by a second sub-frame portion, wherein the first sub-frame portion carries information indicative of whether or not the second sub-frame portion needs to be decoded, wherein a regular micro sleep mode is provided in which the receiver component is switched off after the first sub-frame portion has been decoded in case the decoding indicates that the second sub-frame portion does not need to be decoded and wherein an extended micro sleep mode is provided in which the receiver component is switched off immediately after the first sub-frame portion has been received. The receiver comprises an evaluator adapted to evaluate a mode setting criterion and a controller adapted to control the receiver to enter the regular micro sleep mode or the extended micro sleep mode depending on the mode setting criterion.

The receiver may further comprise a decoder adapted to decode, in the extended micro sleep mode when the receiver component has been switched off, the first sub-frame portion to determine whether the second sub-frame portion needs to be decoded also. In such an implementation, the controller may further be adapted to switch, when the decoding of the first sub-frame portion indicates that the second sub-frame portion would need to be decoded, to the regular micro sleep mode or a regular reception mode.

The receiver may further comprise a triggering component adapted to trigger, when the decoding of the first sub-frame portion indicates that the second sub-frame portion would need to be decoded, a re-transmission of the second sub-frame portion.

The one or more receiver components that are switched off during the regular and extended micro sleep modes may be the same or different for these two modes. Exemplary receiver components that may be switched off include one or more of a complete radio front end, an analog-to-digital converter, a low-noise amplifier, a filter stage, and a mixer stage.

Additionally, the receiver may comprise at least one timer. The timers may include one or more of an uplink time alignment timer and a downlink inactivity timer. The evaluator may be adapted to evaluate a timer expiry as the mode setting criterion.

Also provided is a mobile terminal comprising a transceiver, wherein the transceiver includes the receiver presented herein. The mobile terminal may take the form of a mobile telephone, a smartphone, a network or data card, a notebook, and so on. Moreover, the mobile terminal may be configured to operate according to the LTE standard.

BRIEF DESCRIPTION OF THE DRAWINGS

In the following, the technique presented herein will be described in more detail with reference to exemplary embodiments illustrated in the drawings, wherein.

DETAILED DESCRIPTION

In the following description, for purposes of explanation and not limitation, specific details are set forth, such as specific receiver configurations and specific signalling scenarios, in order to provide a thorough understanding of the technique presented herein. It will be apparent to one skilled in the art that the technique may be practised in other embodiments that depart from these specific details. For example, while the following embodiments will primarily be described with reference to the LTE standard, it will be readily apparent that the technique can also be implemented in connection with other wireless or wired communication standards.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique presented herein may also be embodied in a computer processor and a memory coupled to the processor, wherein the memory stores one or more programs that perform the steps discussed herein when executed by the processor.

Figure 2:
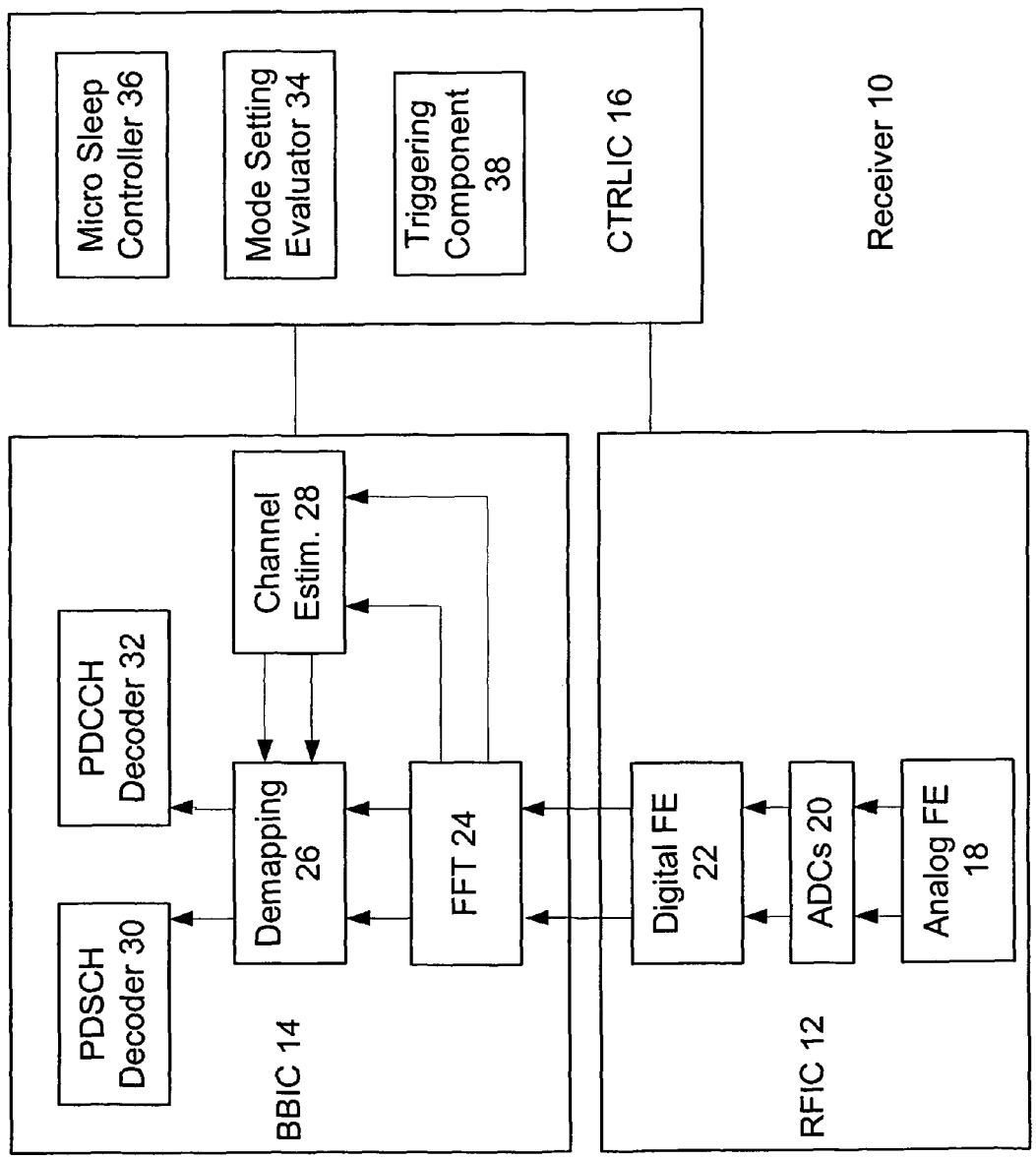
FIG. 2 shows a schematic block chart illustrating a receiver embodiment.

Reference is now made to FIG. 2, which shows an embodiment of a receiver 10 that conforms to the LTE standard. The receiver 10 may belong to a transceiver stage of a mobile terminal (UE) such as a mobile telephone.

As illustrated in FIG. 2, the receiver 10 comprises three separate Integrated Circuits (ICs), or chips. Specifically, the receiver 10 comprises a Radio Frequency (RF) IC 12, a Base Band (BB) IC 14 and a Control IC (CTRLIC) 16. The RFIC 12 communicates with the BBIC 14 via a digital interface. A further digital interface is provided between each of the BBIC 14 and the RFIC 12 on the one hand and the CTRLIC 16 on the other. It should be noted that the receiver 10 could also be realized in a dual or single chip implementation.

The RFIC 12 is configured to receive, via an air interface, an analog signal carrying the PDCCH and the PDSCH. This signal is received from a base station (also called eNodeB). As has been explained above, the PDCCH is transmitted in a first sub-frame portion and the PDSCH is (potentially) transmitted in a second sub-frame portion of a sub-frame transmitted by the eNodeB.

As shown in FIG. 2, the RFIC 12 comprises an analog radio front end 18 including one or more antennas, one or more low-noise amplifiers coupled to the antennas, one or more filter stages, one or more mixer stages, and one or more Local Oscillators (LOs). The RFIC 12 further comprises one or more analog-to-digital converters (ADC's) 20 coupled between the analog radio front end 18 on the one hand and a Digital Front End (DFE) 22 on the other. The DFE 22 comprises one or more filters and one or more down sampling stages.

The DFE 22 of the RFIC 12 is coupled, via the digital interface, to an FFT block 24 of the BBIC 14. Although not specifically illustrated in FIG. 2, a buffer memory is coupled between the DFE 22 and the FFT block 25 to temporarily store signal samples that will be subjected block-wise to the FFT operation carried out by the FFT block 24. The output of the FFT block 14 is fed in parallel to a demapper 26 and a channel estimator 28. The demapper 26 performs its demapping operation based on channel estimates received from the channel estimator 28. The output of the demapper 26 is fed to a PDSCH decoder 30 as well as to a PDCCH decoder 32. The PDCCH decoder 32 is configured to decode the PDCCH transmitted in the first portion of a received sub-frame, whereas the PDSCH is configured to decode the PDSCH (potentially) transmitted in the second portion of this sub-frame.

The CTRLIC 16 comprises a mode setting evaluator 34 configured to evaluate one or more mode setting criterions. The mode setting evaluator 34 drives a micro sleep controller 36 which is adapted to control the receiver 10 to selectively enter a regular micro sleep mode, an extended micro sleep mode or a regular reception mode as will be described in more detail below. The micro sleep controller 36 is in particular adapted to switch off and on one or more receiver components in accordance with the presently commanded receiver mode. As an example, receiver components of the RFIC 12 (e.g., one or more of the analog front end 18, the ADCs 20 and the digital FE 22) may be switched off (and on).

A triggering component 38 of the CTRLIC 16 is configured to trigger re-transmissions in a HARQ procedure. It should be noted that the triggering component 38 need not necessarily be implemented on the CTRLIC 16. Rather, the triggering component 38 could also be formed as part of the BBIC 14.

In the LTE HARQ re-transmission scheme, the information exchanges are organized in Transport Blocks (TBs). Each correct reception of a TB is acknowledged towards the peer. Correct reception is evaluated by re-calculating a Cyclic Redundancy Check (CRC) code and comparing it to the received one. In case of an erroneous reception, a NACK is sent to the peer. The NACK is answered with a re-transmission unless the maximum number of re-transmissions has been exceeded. In the latter case, the NACK is escalated to the next higher network layer.

According to the LTE standard, HARQ is applied both in the Uplink (UL) and the Downlink (DL). Specifically, in the DL unsynchronized HARQ is used. In other words, the base station (eNodeB) decides when to schedule the re-transmission. This means that the timing of the re-transmission is not known in advance to the mobile terminal. However, the mobile terminal has a priori knowledge of the HARQ roundtrip time (8 sub-frames) in the LTE Frequency Division Duplex (FDD) mode. This means that any re-transmission can occur at the earliest 8 sub-frames after the previous transmission. In the Time Division Duplex (TDD) mode, the minimum roundtrip time depends on the current system configuration and may be larger.

Figure 3:
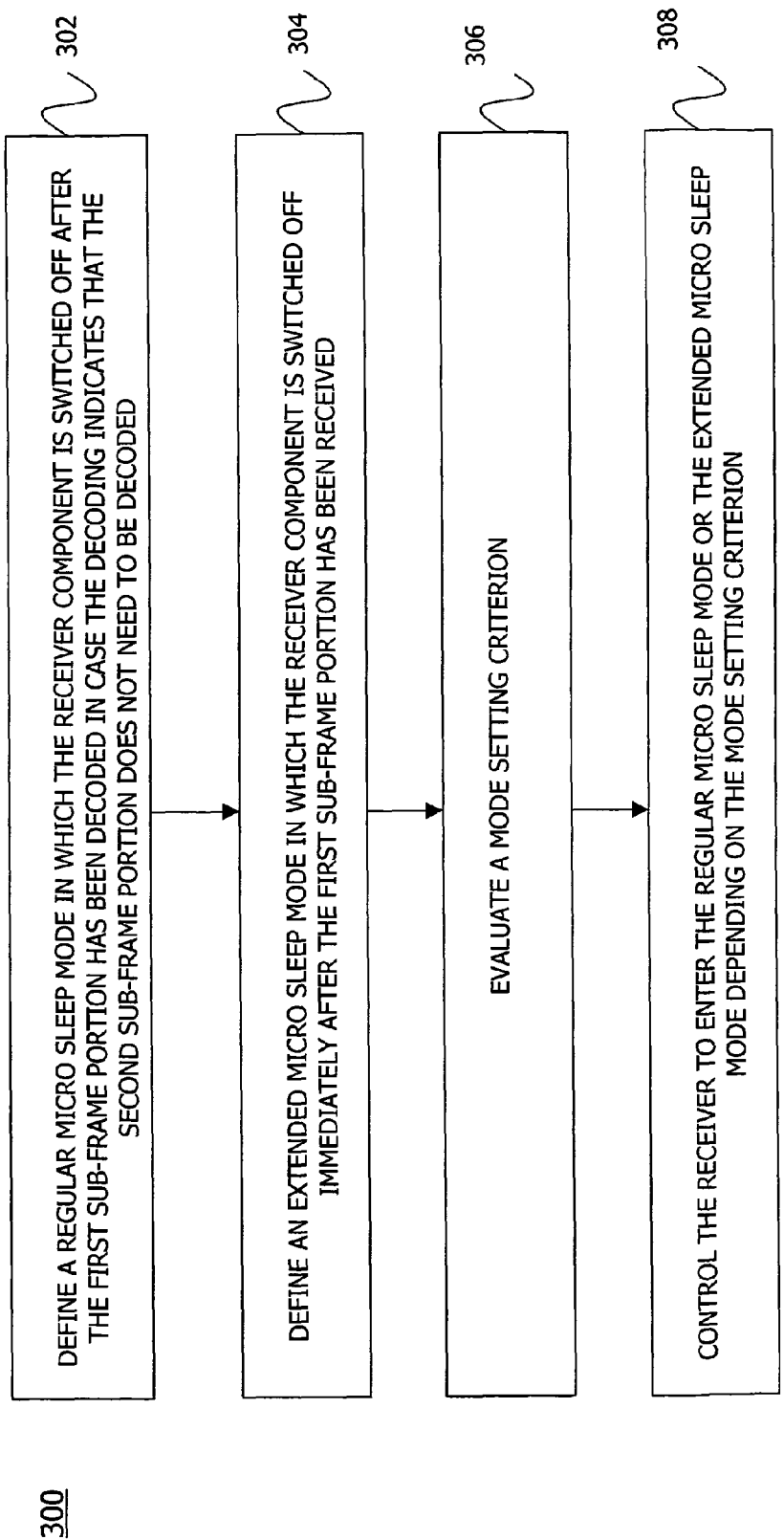
FIG. 3 shows a schematic flow diagram illustrating a method embodiment.

The operation of the receiver 10 under control of the micro sleep controller 36 will now be described in more detail with reference to the flow chart 300 of FIG. 3 and the schematic timing diagram of FIG. 4. The flow chart 300 illustrates a method embodiment in which the receiver 10 is controlled to selectively enter one of two distinct micro sleep modes, namely a regular micro sleep mode and an extended micro sleep mode, or a regular reception mode. The timing diagram of FIG. 4 illustrates the process of entering and leaving the extended micro sleep mode from a regular reception move in mode detail.

The micro sleep controller 36 is configured to operate the receiver 10 either in a regular reception mode, in a regular micro sleep mode (step 302) or in an extended micro sleep mode (step 304). The regular micro sleep mode has already been described above and is illustrated in FIG. 1. In brief, in the regular micro sleep mode the receiver 10 is controlled to switch off at least one receiver component after the first sub-frame portion (i.e., the PDCCH) has been decoded by the PDCCH decoder 32. The receiver component is only switched off in case the decoding by the PDCCH decoder 32 indicates that the second sub-frame portion does not need to be decoded (i.e., that no PDSCH transmission for the mobile terminal incorporating the receiver 10 is scheduled).

Figure 4:
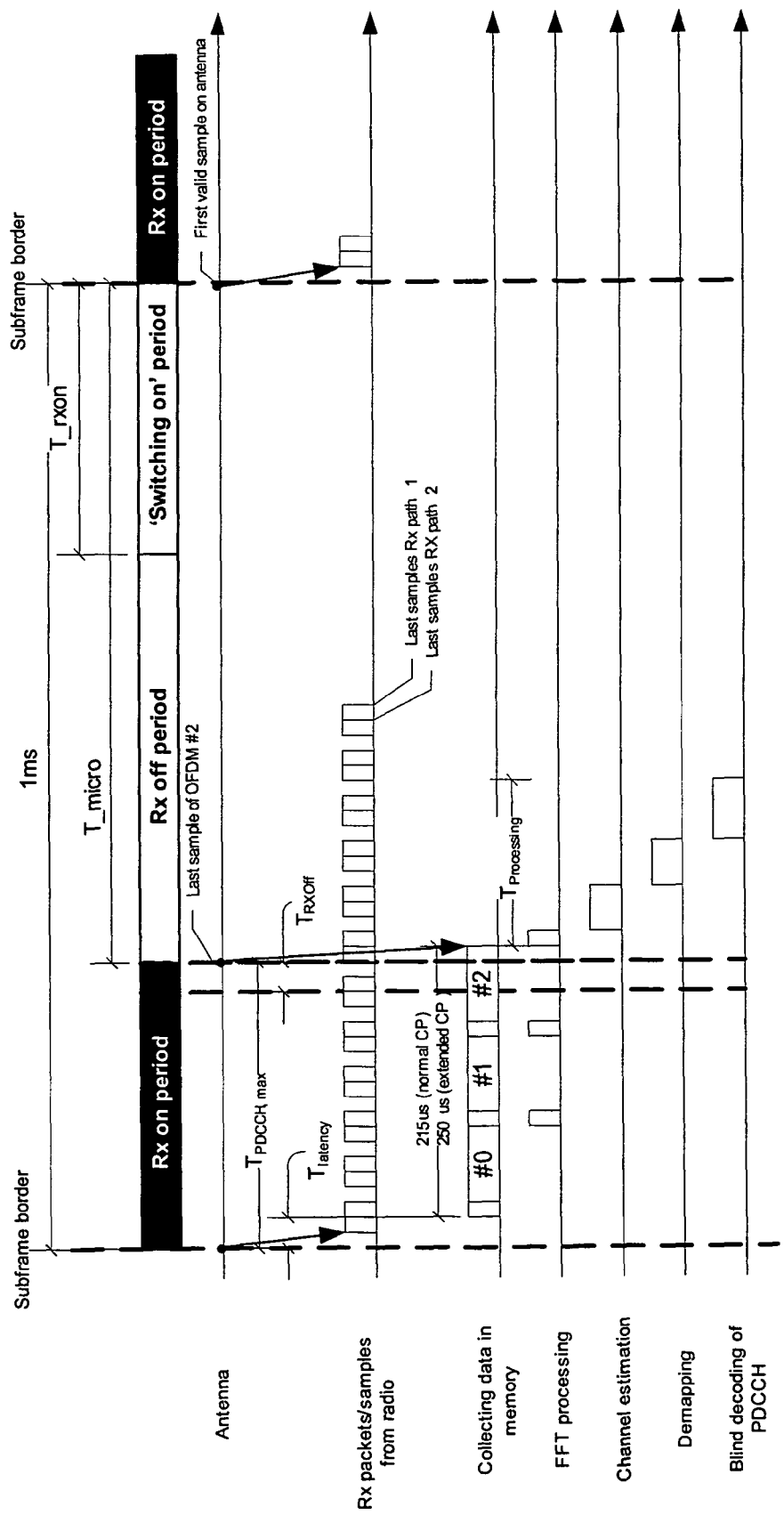
FIG. 4 shows a schematic timing diagram illustrating an extended micro sleep mode.

In the extended micro sleep mode illustrated in FIG. 4, the receiver component is switched off immediately after the first sub-frame portion (i.e., the PDCCH) has been received. In the extended micro sleep mode, the switching off of one or more receiver components can thus be performed at the latest immediately after reception of 4 OFDM symbols (in case of a system bandwidth of 1.4 MHz) or at the latest after reception of 3 OFDM symbols (in the case of a bandwidth larger than 1.4 MHz). The actual number of OFDM symbols that need to be received for the PDCCH can be derived from the Physical Control Format Indicator Channel (PCFICH), which is part of the first OFDM symbol of each sub-frame.

As has been described above, the micro sleep controller 36 is driven by the mode setting evaluator 34. The mode setting evaluator 34 is configured to evaluate one or multiple modes setting criterions (step 306). Several exemplary mode setting criterions will be described in more detail below. The evaluation result of the mode setting evaluator 34 is fed to the micro sleep controller 36, which dynamically switches between the regular reception mode, the regular micro sleep mode and the extended micro sleep mode (step 308).

Since in the extended micro sleep mode the receiver components are switched off immediately after the first sub-frame portion has been received, the switching off can be performed without waiting for the output of the PDCCH decoder 32. For this reason the effective duration of the extended micro sleep mode can be extended in the scenario discussed above by 80%:

$$T_{micro}=1\ ms-(10\ \mu s+215\ \mu s+15\ \mu s+200\ \mu s)=560\ \mu s$$

Figure 1:
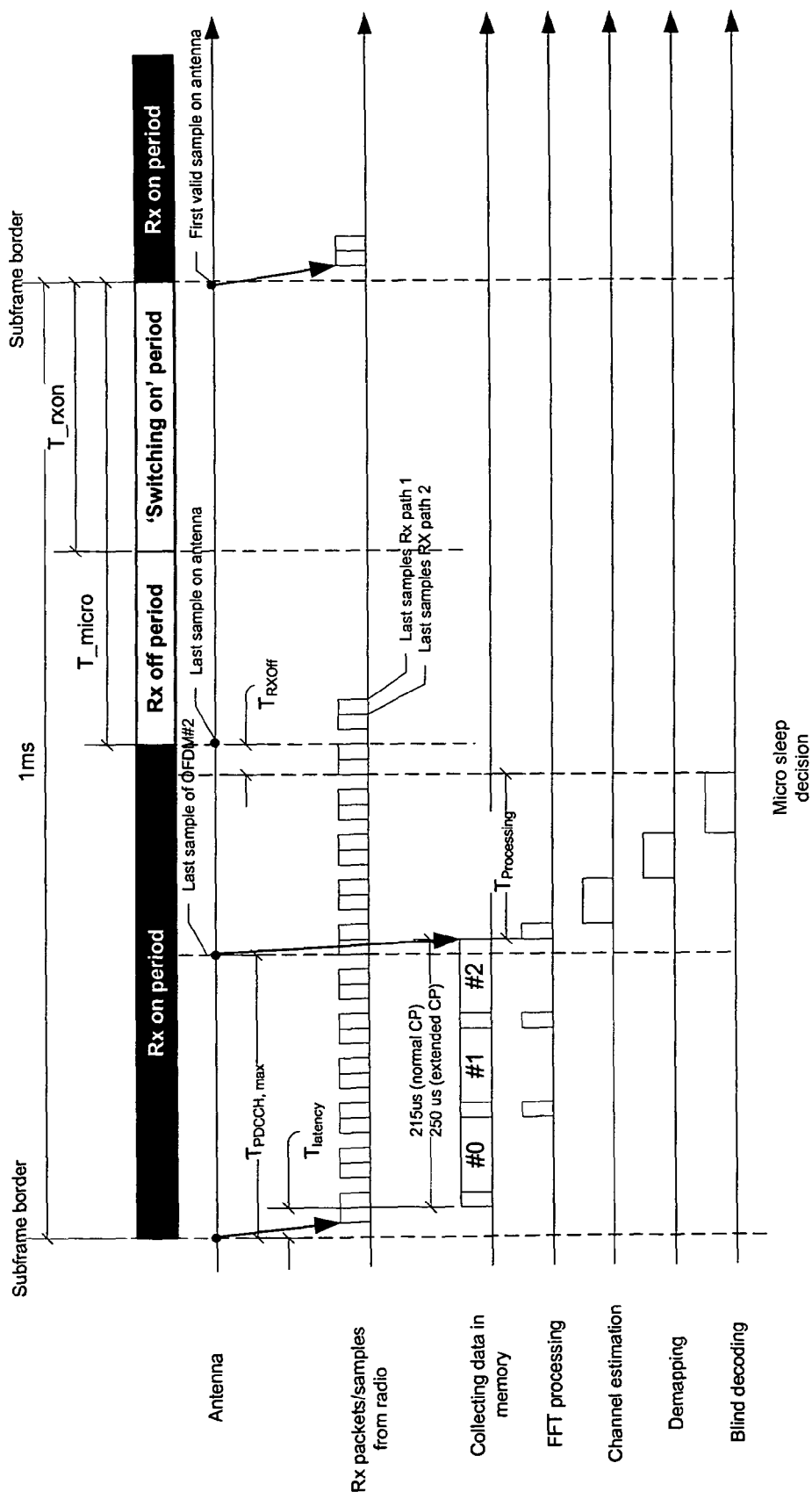
FIG. 1 shows a schematic timing diagram illustrating a regular micro sleep mode.

The longer duration of the extended micro sleep mode compared to the regular micro sleep mode can also be derived from a comparison of the timing diagrams illustrated in FIG. 1 (regular micro sleep mode) and FIG. 4 (extended micro sleep mode). As becomes apparent from this comparison, the "Rx off period" in the extended micro sleep mode starts immediately after the last sample of the third OFDM symbol has become available. This approach extends the extended micro sleep period compared to the regular micro sleep period, in which the "Rx off period" only starts after the PDCCH has been decoded, by the duration of $T_{proc}$.

After switching off one or more receiver components in the extended micro sleep mode as illustrated in FIG. 4, baseband processing of the OFDM symbols carrying the PDCCH is performed by the BBIC 14 as usual except that for channel estimation by the channel estimator 28 only the reference symbols included in OFDM symbols #0 and #1 can be used. Once the PDCCH decoder 32 has decoded the PDCCH and determined that there was no PDSCH transmission scheduled for the user terminal incorporating the receiver 10 (which is often the case in low traffic scenarios), there is no further action required other than switching on the receiver components for the next sub-frame (see FIG. 4).

Figure 5:
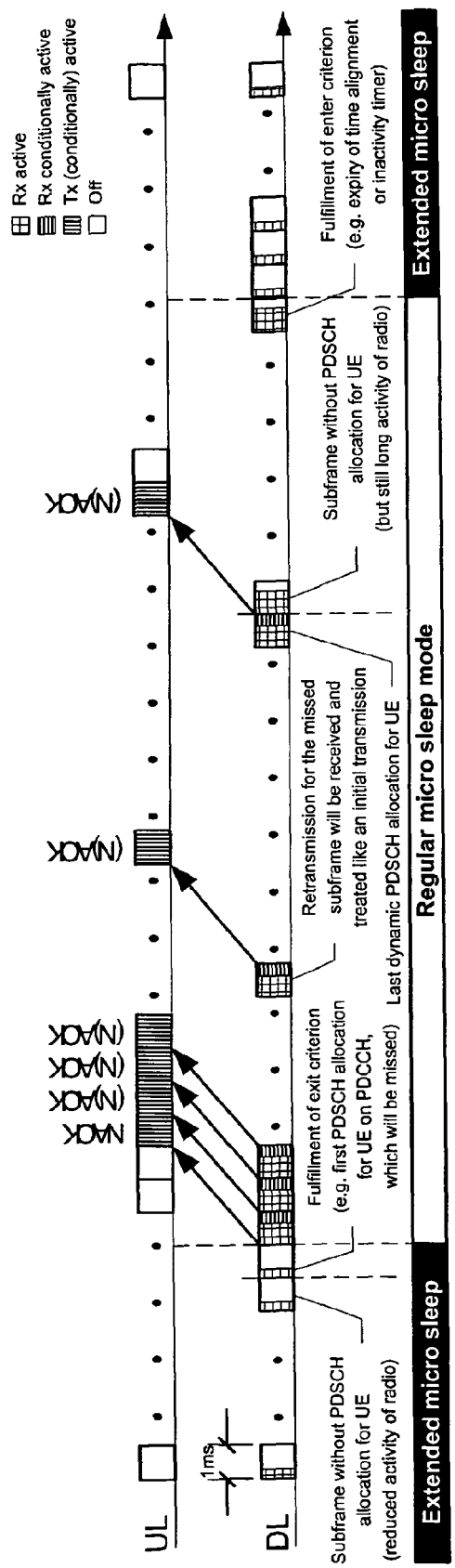
FIG. 5 is a schematic diagram illustrating transitions between the extended micro sleep mode and the regular micro sleep mode in an HARQ scenario.

However, since the one or more receiver components 18 have been switched off instantaneously after reception of the PDCCH, it is no longer possible to receive any dedicated PDSCH transmission that may be included in the remainder of the sub-frame. Therefore, in the case of a missed PDSCH transmission, a re-transmission of the particular sub-frame or sub-frame portion (on a TB basis) is triggered by the triggering component 38. Specifically, when the PDCCH decoder 32 learns from the decoded PDCCH that a PDSCH transmission has been missed in the current extended micro sleep mode, the triggering component 38 initiates the transmission of a Negative Acknowledgment (NACK) in the corresponding UL sub-frame as generally illustrated in the timing diagram of FIG. 5. At the same time, the micro sleep controller 36 controls the receiver 10 to exit the extended micro sleep mode and to enter the regular micro sleep mode (or, alternatively, the regular reception mode).

The NACK sent by the triggering component 38 triggers a HARQ re-transmission. The HARQ re-transmission triggered by the NACK for the PDSCH transmission missed during the extended micro sleep mode can be handled in the receiver 10 like an initial transmission. Hence, the HARQ buffer (implemented, e.g., in the BBIC 14) will be initialized with the first re-transmission rather than with the missed initial transmission of the PDSCH.

Figure 6:
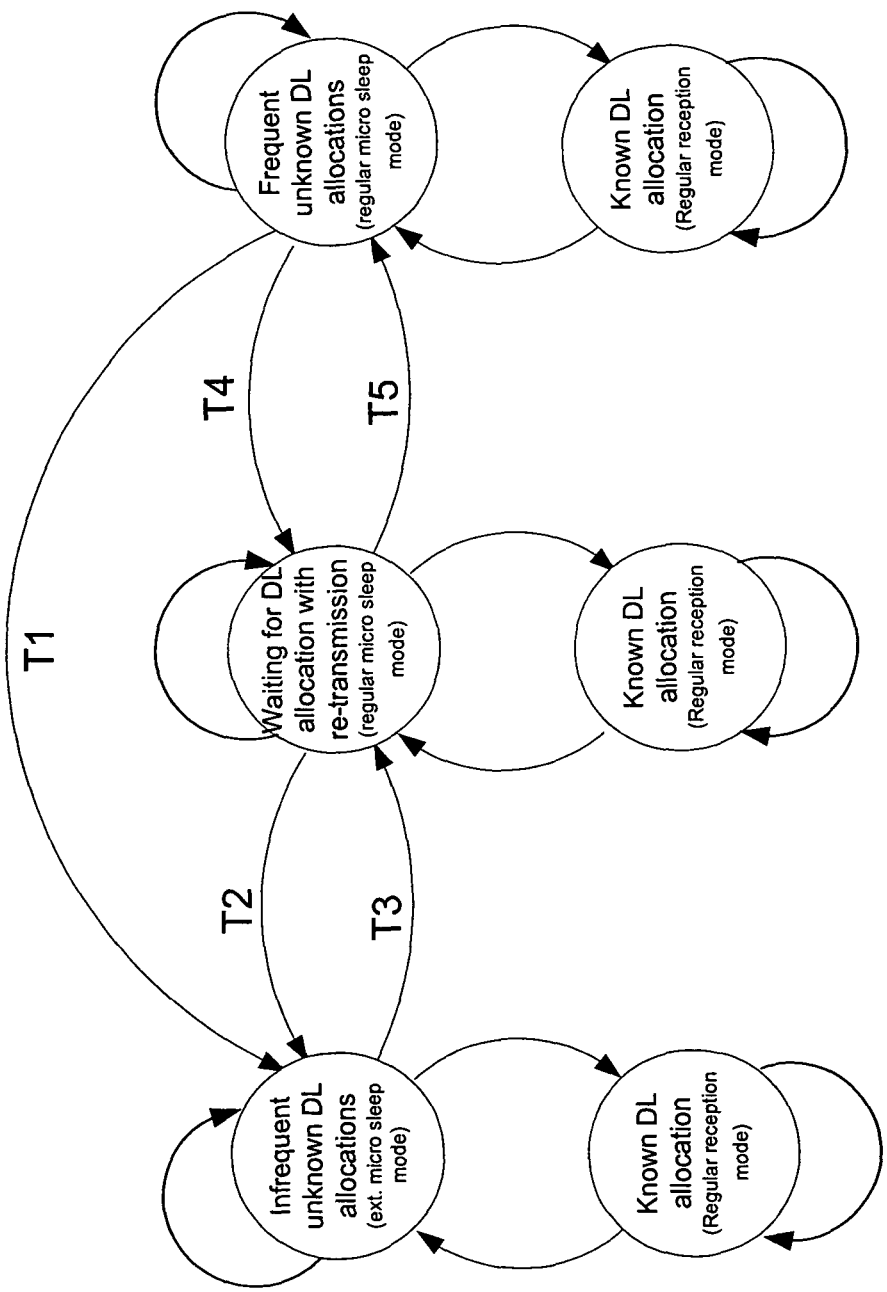
FIG. 6 shows a schematic state diagram illustrating various states representative of different receiver modes as well as possible state transitions.

FIG. 6 shows a state diagram with possible transitions between the regular reception mode, the regular micro sleep mode and the extended micro sleep mode. The state transitions are marked with arrows, assuming one transition per sub-frame (which also includes the transitions that preserve the mode applied for the previous sub-frame). In FIG. 6, transitions T1 and T2 are the transitions for entering the extended micro sleep mode and T3 is the transition for leaving the extended micro sleep mode from the regular sleep mode. The transitions T4 and T5 illustrate transitions between different states of the regular micro sleep mode.

Entering the extended micro sleep mode for a particular sub-frame is not possible when it is a priori known that a PDSCH transmission needs to be received in the same sub-frame. It may therefore be necessary to switch between the extended or regular micro sleep mode (upper state row in FIG. 6) on the one hand and the regular reception mode (lower state row in FIG. 6) on the other hand without evaluation of any criterion regarding entering of any micro sleep mode based on PDSCH allocations (e.g., semi-persistent allocations) that are known a priori. Such an evaluation may also be omitted in case the (P)BCH or SCH needs to be received or in case measurements have to be taken (i.e., based on a predefined measurement schedule). There may also be other criteria that preclude entering of any micro sleep mode, such as difficult propagation conditions with high Doppler bandwidth, which may require reception of all reference symbols for an improved channel estimation. All these criteria control the simple (unmarked) transitions between the upper and the respective lower state in FIG. 6.

Possible criteria for entering the extended micro sleep mode in accordance with transition T1 include individual ones or combinations of the following criteria.

First, an UL time alignment timer defined in the LTE standard on the Medium Access Control (MAC) level may have expired, so that the eNodeB does no longer expect any ACK/NACK transmission in the UL. It is then safe to assume that the eNodeB will not allocate the PDSCH to the mobile terminal in the DL, and that the traffic will only resume under a random access order on the PDCCH. The corresponding timer values are defined by Radio Resource Control (RRC) and may be set to 500 ms or more.

Another criteria for the transition T1 may be defined based on short-term statistics. As an example, for a detection (with hysteresis) that there were many sub-frames without PDSCH allocation for the mobile terminal, the mobile terminal may (re)start a proprietory DL inactivity timer upon receiving a dynamic PDSCH allocation. It should be noted that PDSCH allocation with respect to semi-persistent allocation or system information should not (re)start the timer. The DL inactivity timer will be decremented for each sub-frame without dynamic PDSCH allocation for the mobile terminal. When the DL inactivity timer expires, the mobile terminal may enter the extended micro sleep mode from the regular micro sleep mode as illustrated in FIG. 6. The DL inactivity timer may be set to a value between 10 and 100 ms (e.g., to 40 ms).

Furthermore, a third criterion for the transition T1 may be the a priori knowledge that the next sub-frame is not configured as a fully received sub-frame. Such a priori knowledge may relate to the fact that the next sub-frame does not include the PDSCH (e.g., for MBFSN sub-frames in which only the PDCCH is transmitted) or that the PDSCH (although included) is not needed.

A possible criterion for the transition T2 includes the condition that no further re-transmissions are pending. Additionally, one or more of the criteria defined for the transition T1 need to be satisfied.

The transition T3 is initiated once an "exit criterion" is fulfilled. In such a case, the regular micro sleep mode (or, alternatively, the regular reception mode) will be entered. One possible exit criterion relates to the fact that a sub-frame with a PDSCH allocation for the mobile terminal has been detected. In other words, once the PDCCH decoder 32 has detected a PDSCH allocation during the extended micro sleep mode, and the triggering component 38 has triggered a re-transmission, the receiver 10 is switched to the regular micro sleep mode to prepare for a reception of the PDSCH re-transmission. The re-transmission for a specific HRQ process can be expected earliest in sub-frame n+8 due to the HARQ roundtrip time. One possible switching strategy could therefore be to switch to the regular micro sleep mode at the latest for a reception of the sub-frame n+8 not to miss the re-transmission. As has been discussed above, it is advantageous to ensure that the re-transmission is interpreted as an initial transmission by the mobile terminal. According to a more cautious strategy, the mobile terminal could interpret the current DL scheduling grant on the PDCCH as a resumption of DL activity and start to use the regular micro sleep mode immediately (i.e., for sub-frame n+1) not to miss any initial transmission for other HARQ processes (to support the expected growth of DL traffic).

The transition T4 is taken in case that a DL allocation could not be successfully decoded and a re-transmission is pending. On the other hand, the transition T5 is taken in case that all pending re-transmissions have successfully been decoded, but the conditions for entering the extended micro sleep mode are not (yet) satisfied.

As has become apparent from the above description of preferred embodiments, the technique presented herein provides an extended micro sleep mode which allows to switch off one or more receiver components earlier compared to the regular micro sleep mode. As a result, the power consumption of the receiver can be reduced, which leads to longer stand-by and talk times of battery-operated mobile terminals such as cellular telephones. Of course, the technique presented herein can also advantageously be implemented for energy efficiency reasons in any stationary devices having virtually unlimited power resources.

In the foregoing, principles, embodiments and various modes of implementing the technique presented herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method of controlling a receiver of a communication device, the method comprising:
   determining, based on an evaluation of a mode setting criterion, whether the receiver should enter a regular micro sleep mode or an extended micro sleep mode;
   receiving, by the receiver component, a first sub-frame portion; and
   as a result of determining that the receiver should enter the extended micro sleep mode, performing the following steps:
   switching off the receiver component immediately after the first sub-frame portion has been received and before any determination is made as to whether the second sub-frame portion includes data intended to be received and decoded by the communication device; and switching on the receiver component at a later point in time at which the receiving component is not operable to receive and decode data included in the second sub-frame portion of the first sub-frame but is operable to decode a first sub-frame portion of a second sub-frame that immediately follows the first sub-frame, wherein the regular micro sleep mode is a micro sleep mode in which the receiver component is switched off in response to a determination that a result of a decoding of a first sub-frame portion of a first sub-frame indicates that a second sub-frame portion of the first sub-frame does not need to be decoded.

2. The method of claim 1, further comprising decoding the first sub-frame portion to determine whether the second sub-frame portion includes data intended to be received and decoded by the communication device while the receiver is in the extended micro sleep mode.

3. The method of claim 2, further comprising triggering a re-transmission of the second sub-frame portion as a result of determining that the second sub-frame portion includes data intended to be received and decoded by the communication device while the receiver is in the extended micro sleep mode.

4. The method of claim 3, further comprising switching to the regular micro sleep mode or a regular reception mode as a result of determining that the second sub-frame portion includes data intended to be received and decoded by the communication device while the receiver is in the extended micro sleep mode.

5. The method of claim 4, further comprising:
receiving the re-transmitted second sub-frame portion in either one of the regular micro sleep mode and the regular reception mode; and
initializing a Hybrid Automatic Repeat Request, or HARQ, buffer based on the re-transmission.

6. The method of claim 1, wherein the mode setting criterion is based on short-term statistics regarding whether second sub-frame portions needed to be decoded previously.

7. The method of claim 1, wherein the mode setting criterion is based on a priori knowledge.

8. The method of claim 7, wherein the a priori knowledge relates to one or more of a semi-persistent allocation of relevant content in the second sub-frame portion, a measurement schedule, a re-transmission behaviour, channel conditions, a Shared Channel, or SCH, reading and a Broadcast Channel, or BCH, reading.

9. The method of claim 7, wherein the receiver is configured to evaluate the mode setting criterion on a per sub-frame basis, and further comprising skipping the evaluation for one or more sub-frames depending on the a priori knowledge.

10. The method of claim 1, wherein the mode setting criterion is based on expiry of at least one of an uplink time alignment timer and a downlink inactivity timer.

11. The method of claim 1, wherein the first sub-frame portion is defined by a predetermined number of modulation symbols representative of at least a first transmission channel and the second sub-frame portion is defined by a predetermined number of modulation symbols representative of at least a second transmission channel.

12. The method of claim 11, wherein the first transmission channel is a Physical Downlink Control Channel and the second transmission channel is a Physical Downlink Shared Channel according to the 3rd Generation Partnership Project's Long Term Evolution standard.

13. The method of claim 1, wherein information carried in the first sub-frame portion relates to a downlink scheduling grant.

14. A computer program product comprising a non-transitory computer readable medium storing program code for performing the steps of claim 1 when the computer program product is executed on a computing device.

15. A receiver that is controllable to enter a micro sleep mode during which at least one receiver component is temporarily switched off, wherein the receiver is configured to process sub-frames each having a first sub-frame portion followed by a second sub-frame portion, the first sub-frame portion carrying information indicative of whether or not the second sub-frame portion needs to be decoded, wherein a regular micro sleep mode is provided in which the receiver component is switched off after the first sub-frame portion of a first sub-frame has been decoded in case the decoding indicates that the second sub-frame portion of a first sub-frame does not need to be decoded, the receiver comprising:
a receiver component;
a processor for determining, based on an evaluation of a mode setting criterion, whether the receiver should enter a regular micro sleep mode or an extended micro sleep mode; and
a controller, wherein the controller is configured such that, as a result of the processor determining that the receiver should enter the extended micro sleep mode, the controller:
switches off the receiver component immediately after a first sub-frame portion of a first sub-frame has been received and before any determination is made as to whether a second sub-frame portion of the first sub-frame includes data intended to be received and decoded by the receiver; and
switches on the receiver component at a later point in time at which the receiving component is not operable to receive and decode data included in the second sub-frame portion of the first sub-frame but is operable to decode a first sub-frame portion of a second sub-frame that immediately follows the first sub-frame.

16. The receiver of claim 15, further comprising a decoder adapted to decode, in the extended micro sleep mode when the receiver component has been switched off, the first sub-frame portion to determine whether the second sub-frame portion would need to be decoded, wherein the controller is further adapted to switch, when the decoding of the first sub-frame portion indicates that the second sub-frame portion would need to be decoded, to the regular micro sleep mode or a regular reception mode.

17. The receiver of claim 16, further comprising a triggering component adapted to trigger, when the decoding of the first sub-frame portion indicates that the second sub-frame portion would need to be decoded, a re-transmission of the second sub-frame portion.

18. The receiver of claim 15, wherein the receiver comprises one or more of the following receiver components configured to be switched off during the regular and extended micro sleep modes: a complete radio front end, an analog-to-digital converter, a low-noise amplifier, a filter stage, and a mixer stage.

19. The receiver of claim 15, further comprising at least one of an uplink time alignment timer and a downlink inactivity timer, wherein the processor is adapted to evaluate a timer expiry as the mode setting criterion.

20. A mobile terminal comprising a transceiver, the transceiver including the receiver of claim 15.

21. The mobile terminal of claim 20, configured to operate according to the 3rd Generation Partnership Project's Long Term Evolution standard.

* * * * *